(12) United States Patent
Blecha

(10) Patent No.: US 9,791,052 B2
(45) Date of Patent: Oct. 17, 2017

(54) VACUUM SLIDE GATE VALVE

(71) Applicant: VAT Holding AG, Haag (CH)

(72) Inventor: Thomas Blecha, Feldkirch (AT)

(73) Assignee: VAT HOLDING AG, Haag (CH)

( * ) Notice: Subject to any disclaimer, the term of this patent is extended or adjusted under 35 U.S.C. 154(b) by 338 days.

(21) Appl. No.: 14/139,352

(22) Filed: Dec. 23, 2013

(65) Prior Publication Data

US 2014/0183391 A1    Jul. 3, 2014

(30) Foreign Application Priority Data

Dec. 27, 2012   (EP) .................................. 12199489

(51) Int. Cl.
*F16K 3/16* (2006.01)
*F16K 51/02* (2006.01)
*F16K 3/18* (2006.01)

(52) U.S. Cl.
CPC ............... *F16K 3/16* (2013.01); *F16K 3/182* (2013.01); *F16K 3/186* (2013.01); *F16K 51/02* (2013.01)

(58) Field of Classification Search
CPC ............. F16K 3/16; F16K 51/02; F16K 3/186
USPC ................................ 251/204, 203, 193, 326
See application file for complete search history.

(56) References Cited

U.S. PATENT DOCUMENTS

| 5,415,376 | A | 5/1995 | Ito |
| 5,641,149 | A | 6/1997 | Ito |
| 5,755,255 | A | 5/1998 | Iwabuchi |
| 5,769,952 | A | 6/1998 | Komino |
| 5,934,646 | A | 8/1999 | Tamura |
| 6,045,117 | A | 4/2000 | Tamura |
| 6,056,266 | A | 5/2000 | Blecha |
| 6,082,706 | A | 7/2000 | Irie |
| 6,089,537 | A | 7/2000 | Olmsted |
| 6,095,180 | A | 8/2000 | Ishigaki |
| 6,416,037 | B1 | 7/2002 | Geiser |
| 6,431,518 | B1 | 8/2002 | Geiser |
| 6,494,434 | B1* | 12/2002 | Geiser ...................... F16K 1/24 251/229 |
| 6,561,483 | B2 | 5/2003 | Nakagawa |

(Continued)

FOREIGN PATENT DOCUMENTS

| CN | 1987170 A | 6/2007 |
| CN | 102575777 A | 7/2012 |

(Continued)

*Primary Examiner* — Mary McManmon
*Assistant Examiner* — Nicole Wentlandt
(74) *Attorney, Agent, or Firm* — Maschoff Brennan

(57) ABSTRACT

A vacuum slide gate valve with a drive unit that is formed in such a way that a closure plate, by displacement of at least one valve rod along a longitudinal axis, is displaceable from an open position into an intermediate position, and, by displacement of said valve rod along a transverse axis running at right angles to the longitudinal axis, is displaceable from the intermediate position into a closing position. The valve rod is rigidly connected to a sliding part, which is guided between a first position and a second position parallel to the longitudinal axis, and between the second position and a third position parallel to the transverse axis. A displacement member is mechanically coupled to the sliding part via an inclined connection to displace the sliding part from the first position into the second position and from the second position into the third position.

20 Claims, 8 Drawing Sheets

(56) References Cited

U.S. PATENT DOCUMENTS

| | | |
|---|---|---|
| 6,561,484 B2 | 5/2003 | Irie |
| 6,629,682 B2 | 10/2003 | Duelli |
| 7,114,702 B2 | 10/2006 | Sauer |
| 7,658,367 B2 | 2/2010 | Geiser |
| 7,762,527 B2 | 7/2010 | Schoen et al. |
| 7,766,305 B2 * | 8/2010 | Kim .................. F16K 3/184 251/158 |
| 2008/0083897 A1 | 4/2008 | Chen |
| 2008/0302989 A1 | 12/2008 | Seitz |
| 2011/0175011 A1 | 7/2011 | Ehrne |
| 2012/0205570 A1 | 8/2012 | Lamprecht |

FOREIGN PATENT DOCUMENTS

| | | |
|---|---|---|
| DE | 10 2007 030 006 A1 | 2/2008 |
| DE | 10 2008 049 353 A1 | 4/2010 |
| EP | 1 577 592 A1 | 9/2005 |
| JP | 2005-147213 A | 6/2005 |
| WO | 2005/064236 A | 7/2005 |
| WO | 2009/070824 A1 | 6/2009 |
| WO | 2010/034046 A1 | 4/2010 |

\* cited by examiner

VACUUM SLIDE GATE VALVE

FIELD OF INVENTION

The invention relates to a vacuum slide gate valve.

BACKGROUND

Vacuum valves for substantially gas-tight closure of a flow path, which leads through an opening formed in a valve body, are generally known in different embodiments from the prior art. Vacuum slide gate valves are used in particular in the field of IC and semiconductor manufacture, which has to take place in a protected atmosphere where possible, without the presence of contaminating particles. For example, in a manufacturing plant for semiconductor wafers or liquid-crystal substrates, the highly sensitive semiconductor or liquid-crystal elements sequentially pass through a plurality of process chambers, in which the semiconductor elements located within the process chamber are processed in each case by means of a processing apparatus. Both during the processing procedure within the process chamber and during the transport from process chamber to process chamber, the highly sensitive semiconductor elements must always be located in a protected atmosphere, in particular in a vacuum. The process chambers are interconnected for example via connection paths, wherein the process chambers can be opened by means of vacuum slide gate valves in order to transfer the parts from one process chamber to the next process chamber and can be closed in a gas-tight manner subsequently to the execution of the respective manufacturing step. Valves of this type are also referred to as vacuum transfer valves on account of the described field of application and also as rectangular gate valves on account of their rectangular opening cross section.

Since transfer valves are used, inter alia, in the production of highly sensitive semiconductor elements, the particle generation, which is caused in particular by the actuation of the valve, and the number of free particles in the vacuum region of the valve chamber have to be kept as low as possible. The particle generation is primarily a result of friction, for example by metal-metal contact and by abrasion.

The sealing can be produced for example either via a seal arranged on the closure side of the closure disk, said seal being pressed onto the valve seat running around the opening, or via a ring seal on the valve seat, against which the closure side of the closure disk is pressed. Different sealing devices are known from the prior art, for example from U.S. Pat. No. 6,629,682 B2 (Duelli). A suitable material for ring seals is the resilient sealing material known under the trade name Viton®, for example.

The demands on the seals used in vacuum valves are very high. On the one hand, in the closed state of the valve, the tightness of the valve must be ensured. This is a great challenge particularly due to the high differential pressures in the vacuum region and the large forces thus occurring, which act on the valve closure. Since the seals used are subject to an above-average high level of wear or are destroyed when pressed with an excessively high level of force, the valve must be designed in such a way that the differential pressure forces cannot act on the seals or can only act thereon to a limited extent. The seal should be pressed as uniformly as possible over its course, which requires a uniform contact pressure of the valve disk against the valve seat in the entire contact region. In particular, transverse stresses and longitudinal stresses on the seal are to be kept as low as possible. In the case of transverse stresses transverse to the longitudinal direction of the seal, there is the risk in the case of O-ring seals that they will be torn from their mounting, in particular the groove in which they are fixed. Even vulcanized seals can be exposed only to very limited transverse forces. Both in the open and closed state of the valve, the seals are exposed to aggressive media in part and therefore have to be produced either in such a way that they can withstand the influences and/or are moved out from the flow path of the medium, also so as to avoid abrasion. Excessively high wear of the seal constitutes an uncertainty factor for the process reliability and requires regular replacement of the seal, which in turn leads to increased downtimes in the process.

Different embodiments of vacuum valves, in particular the drive technologies thereof, are known from the prior art and, inter alia, aim to increase the service life of the used seals and also aim to provide improved process reliability.

Depending on the respective drive technologies, a distinction is made in particular between slide gate valves, also referred to as gate valves or rectangular gate valves, and shuttle valves, wherein the valve is closed and opened in the prior art usually in two steps. In a first step, a valve closure member, in particular a closure disk, in the case of a slide gate valve, as is known for example from U.S. Pat. No. 6,416,037 (Geiser) or U.S. Pat. No. 6,056,266 (Blecha), in particular of the L-type, is slid linearly over an opening substantially parallel to the valve seat, or, in the case of a shuttle valve, as known for example from U.S. Pat. No. 6,089,537 (Olmsted), is pivoted about a pivot axis over the opening, without any contact during this process between the closure disk and the valve seat of the valve body. In a second step, the closure disk is pressed via the closure side thereof against the valve seat of the valve body, such that the opening is closed in a gas-tight manner.

The described two-stage movement, in which the closure member is first slid transversely over the opening without there being any contact between the seal and the valve seat, and the closure member is then pressed substantially perpendicularly onto the valve seat, besides the possibility of precise control of the volume flow rate, in particular has the advantage that the seal is pressed practically exclusively perpendicularly without there being a transverse or longitudinal stressing of the seal. A disadvantage however is the relatively complex design of the drive, which in particular is formed either by a single drive, which enables an L-shaped movement of the closure member, or by a plurality of drives, for example two linear drives or one linear drive and one spreading drive. Spreading drives, which are usually arranged immediately behind the closure disk and displace said disk against the valve seat in a perpendicular direction relative to the shaft on which the spreading drives are located, additionally have the disadvantage that a multiplicity of mechanical parts, which perform movements relative to one another, are arranged in the valve interior, that is to say in the highly sensitive vacuum region of the valve. This, on the one hand, increases the complexity of the design and on the other hand the production of process-damaging friction particles. A further disadvantage of the multi-stage movement is the limited speed of movement of the closure member between the fully open and fully closed state. Wedge valves, which are displaced only linearly, indeed enable a high speed of displacement of, but, due to the transverse stressing of the seal, are suitable only to a limited extent for use as a primary seal in the vacuum region, and then only for a few displacement cycles.

The closing movement of a slide gate valve occurring in two steps can be achieved by means of different mechanisms. The closure disk, mounted for example on two connecting rods, is connected via the connecting rods to a drive mechanism, which, due to a substantially linear movement along the connecting rod axis, enables a substantially parallel sliding of the closure disk over the opening to be closed. By means of the same drive mechanism, it is possible, by pivoting the connecting rods, to pivot the closure disk, which is then located opposite the opening at a distance therefrom and substantially parallel to the valve seat, in the direction of the valve seat and to press the closure disk substantially perpendicularly against the valve seat. Instead of two connecting rods, it is also possible for only one connecting rod to be used. The use of more than two connecting rods is likewise possible. Different types of drive mechanisms of this type are known from the prior art and may each result in a slightly different displacement path of the connecting rod and therefore of the closure disk. For example, instead of an arcuate pivoting of the closure disk onto the valve seat, an absolutely linear movement of the closure disk can thus be introduced perpendicularly with respect to the valve seat, for example. Drive mechanisms which enable both a substantially linear sliding of the closure disk over the opening and a substantially perpendicular pressing of the closure disk onto the valve seat running around the opening are known for example from U.S. Pat. No. 5,415,376 A, U.S. Pat. No. 5,641,149 A, U.S. Pat. No. 6,045,117 A, U.S. Pat. No. 5,934,646 A, U.S. Pat. No. 5,755,255 A, U.S. Pat. No. 6,082,706, U.S. Pat. No. 6,095,180 and U.S. Pat. No. 6,629,682 B2.

The two-stage sequence of movements can also be attained however by means of a plurality of separate drive mechanisms. For example, slide gate valves of which the connecting rods are only linearly movable along the connecting rod axis, whereby the closure disk can be slid in parallel over the opening without there being any contact between the closure disk and the valve seat, are described in U.S. Pat. No. 6,056,266 (Blecha) and U.S. Pat. No. 6,561,484 (Nakagawa). In this case, the drive mechanism can be formed by a single linear movement drive, for example a cylinder drive. The pressing of the closure disk against the valve seat is achieved by a separate drive in the closure disk divided into two or between the closure disk and the connecting rod. This separate drive is formed in particular as a cylinder drive, by means of which the closure side of the closure disk can be pressed perpendicularly against the valve seat in a straight line, as presented in U.S. Pat. No. 6,056,266 (Blecha).

A similar vacuum valve is presented in DE 10 2007 030 006 A1. A piston-cylinder unit, which is mounted so it can be slid in parallel as a whole with respect to the valve body in a direction transverse to the longitudinal axis of the valve rod, is used to slide the valve rod in its longitudinal direction. A further piston-cylinder unit, likewise arranged outside the vacuum region, is used for the parallel sliding motion.

In DE 10 2008 049 353 A1 (Ehrne, Blecha), a vacuum valve is described, of which the valve rod is guided out from the vacuum region and is connected outside the vacuum region both to a longitudinal drive device and to a separate transverse drive device and also to a bearing unit.

With the vacuum valve known from WO 2010/034046 A1, the valve rod is firstly slid in the direction of its longitudinal axis in order to close the vacuum valve, and the valve rod is then slid in parallel, transverse to its longitudinal axis. To this end, the valve rod is mounted so it can be slid in the direction of its longitudinal axis by a bearing unit arranged outside the vacuum region. The bearing unit can be slid jointly with the valve rod, transverse thereto. For this purpose, piston-cylinder units are used which act in this transverse direction. In other exemplary embodiments, the piston-cylinder units act in the direction of the longitudinal axis of the valve rod, wherein the transverse movement of the bearing unit is generated by means of links which form a parallelogram guide.

Different embodiments of slide gate valves which comprise a closure disk divided into two are known from U.S. Pat. No. 6,561,483 (Nakagawa) and U.S. Pat. No. 6,561,484 (Nakagawa et al.). A first disk portion has an opening. A second disk portion is connected by means of an expandable body to the first disk portion. An actuator is arranged between the first and the second disk portion, and therefore the two disk portions can be moved actively towards one another and away from one another. The expandable body is formed as a bellows. The first disk portion can be pressed by means of the actuator against the valve seat, wherein the second disk portion (in particular in the case of an overpressure on the valve seat side) is supported on an opposite side of the valve body where necessary. Since drive elements are located within the highly sensitive vacuum region, the risk of possible contaminations owing to friction particles, which may be caused by the drive arranged directly on the valve disk, is relatively large, as a result of which particular sealing measures have to be taken. A sealing of this type constitutes a bellows, for example. The design of vacuum valves of this type with drives in the closure disk is relatively complex, in particular due to the need to use this additional seal, in particular provided by the bellows or a plurality of ring seals for sealing the first disk portion with respect to the second disk portion and with respect to the valve seat, is awkward to maintain and is susceptible to contaminations.

A slide gate valve formed as a vacuum transfer valve which is basically composed of a linear adjustment drive, a connecting rod displaceable linearly along its connecting rod axis, and a closure part, is known from U.S. Pat. No. 5,769,952 (Komino). The closure part is connected via two branches to the connecting rod. By displacing the connecting rod linearly along the connecting rod axis in the closing direction, the closure part can be slid in parallel over the valve opening, wherein the valve part is located opposite the valve seat, which surrounds the opening, and at a distance from the valve seat. The two branches are each mounted pivotably at one end on a transverse rod extending transversely to the connecting rod and running parallel to the valve seat plane and are each mounted pivotably at the other end on the closure part. Both branches are arranged parallel to one another in the direction of the transverse rod and, on the side of the closure part and on the side of the transverse rod, each have a common geometric pivot axis. The branches hold the closure part in such a way that the geometric pivot axis on the transverse rod side is located below the pivot axis on the closure part side with respect to the closing direction of the linear displacement direction of the connecting rod, such that a force acting against the closing direction of the connecting rod onto the closure part leads to a reduction of the distance between the two pivot axes with respect to the closing direction. A guide roller is arranged at the end of the linear displacement path of the closure part. If there is contact between the closure part and the guide roller, the closure part can no longer be displaced further in the closing direction. The linear displacement drive however still exerts a force onto the closure part, such that the branches pivot out, thus approaching the perpendicular position with respect to the linear displacement direction, and acting as a lever. The closure part is hereby displaced in the direction toward the valve seat and is pressed thereagainst. An advantage of a slide gate valve of this type is the drive of relatively simple design, since the connecting rod only has to be slid linearly. Due to the arrangement of the pivot axes, the parallel alignment of the closure part with respect to the valve seat is not ensured, as a result of which the closure part initially sits in an inclined manner when contacting the valve seat, shear forces on the seal are unavoidable, and a uniformly distributed contact pressure is not ensured. Due to use of the guide roller and the pivot bearing, the generation of particles, in particular owing to friction, cannot be prevented, as a result of which the freedom from particles in the vacuum region of the valve is not ensured.

In addition, inclined surface guides are known from the prior art in order to press the valve disk in a last portion of the closing path against the valve seat surrounding the valve opening. Such inclined surface guides are described for example in WO 2005/064236 A1 and WO 2009/070824 A1. These inclined surface guides are arranged in the sensitive vacuum region of the valve, wherein particles are generated and undesirable contaminations are produced.

A vacuum slide gate valve with a closure disk and a linear drive is described in US 2008/0302989 A1 (Seitz). At least one pivot element extends on the rear face of the closure disk and is pivotable in the direction of displacement of the connecting rod. The pivot element is formed by at least two branches, which are coupled to one another pivotably in a parallelogram-like manner and are interspaced in parallel in the direction of displacement of the connecting rod. An engagement element is arranged in such a way that a portion of the branch element in the closing direction is prevented from being slid further in the closing direction once the intermediate position has been reached, wherein the branch element is pivoted out in such a way that the closure disk is pressed against the valve seat into the closing position. This embodiment has the advantage of a particularly simple design of the drive mechanism and, in the case of a specially disclosed embodiment, the advantage of a linear, perpendicular movement of the valve disk toward the valve seat, such that the seal is pressed uniformly onto the valve seat and is free from transverse forces. The presence of an additional mechanical element and also a support structure in the vacuum region of the valve is disadvantageous for some applications.

In US 2008/0083897 A1 (Chen), which is considered to be the closest prior art, a vacuum valve is described, in which the valve rods of a valve disk are guided out from the vacuum region through an aperture in the form of a bellows and are connected outside the vacuum region to a movement bar. The movement bar is mounted by means of rollers in an L-shaped link guide and is coupled to a linear drive via a pivot bar, which is arranged at an incline with respect to the axial direction of the valve rods and of which one end is pivotably connected to movement bars and of which the other end is guided in a linearly slidable manner by means of rollers. When closing the valve disk starting from an open position, the end of the pivot bar mounted in a linearly slidable manner by means of rollers is slid by the actuator parallel to the axial direction of the valve rods and in doing so entrains the movement bar in the axial direction of the valve rods until the rollers of the movement bar pass from a linear portion of the link guide extending parallel to the axial direction of the valve rods into a portion of the link guide extending transversely. Due to the inclined arrangement of the pivot bar, as a result of the further linear sliding of the end of the pivot bar, the rollers of the movement bar are slid in the transversely extending portion of the link guide until they impact against the end of this portion. Due to this transverse sliding of the movement bar, the valve rods pivot about a geometric pivot axis arranged close to the aperture, such that the valve disk is pressed against the valve seat by means of the pivot motion. An advantage of the described embodiment is that merely a single linear drive has to be used, and the key drive components are arranged outside the vacuum region, such that the generation of process-damaging particles in the vacuum region is kept low. A further advantage lies in the improved serviceability of the drive components, since the drive region and the vacuum region are separated in a gas-tight manner by means of the bellows. A disadvantage however is that the valve disk is not pressed perpendicularly against the valve seat by means of a linear transverse movement, since the transverse movement is a pivoting movement, such that uniform pressing of the seal between the valve disk and the valve seat is not ensured. A further problem is that, due to the very long lever arm owing to the length of the valve rods when the valve disk is loaded, a very high force acts both on the pivot bar and on the movement bar. Due to the ratios of the lever arms and the necessary resilience of the highly stressed parts, precise guidance and precise pressing of the valve disk against the valve seat are hardly possible. The maximum load-bearing capacity of the valve disk and therefore also the maximum pressure difference of the valve are relatively low. Due to non-uniform pressing and transverse movements, the seal is subject to increased wear.

The object of the invention is therefore to provide a vacuum slide gate valve, in particular a vacuum transfer valve, which, owing to a drive of relatively simple design in the form of only one actuator where possible, is characterized by low particle generation in the vacuum region, low wear of the seal due to a substantially perpendicular and uniform pressing of the seal against the valve seat, a high load-bearing capacity of the vacuum valve, and good serviceability.

This object is achieved by the implementation of the characterizing features of the independent claim. Features which develop the invention alternatively or advantageously are to be inferred from the dependent patent claims.

The vacuum slide gate valve according to the invention for gas-tight closure of a flow path comprises a valve body with a valve wall, which has an opening for the flow path. The flow path is generally understood to mean an opening path, which is to be closed, between two regions—in particular between two coating plants of any type, for example for solar or other applications, or between a process chamber for semiconductor manufacture and either a further process chamber or the outside world. The flow path, for example, is a connection path between two interconnected process chambers, wherein the process chambers can be opened by means of the vacuum valve in order to transfer the semiconductor parts from one process chamber to the next process chamber and can be closed in a gas-tight manner subsequently to the execution of the respective manufacturing step. Valves of this type are also referred to as vacuum transfer valves due to the described field of application and also as rectangular gate valves due to their generally rectangular opening cross section. Of course, any other application of the vacuum valve according to the invention for substantially gas-tight closure of any flow path is also possible.

The opening may have any cross section, in particular a rectangular, circular or oval cross section. The vacuum valve is preferably formed as a transfer valve with an elongated, in particular substantially rectangular, opening cross section, wherein the width of the opening perpendicular to the displacement axis is preferably at least twice or at least three times or at least five times the height of the opening parallel to the displacement axis. It is also possible however to design the opening cross section differently, for example in a circular manner, wherein the vacuum valve is a pump valve, for example. The opening has a center axis, which, in the region of the opening in the middle of the flow path, extends parallel thereto. This geometric opening axis is arranged perpendicularly on the surface spanned by the opening and it extends along the flow path for example.

In a specific embodiment, a second valve wall with a second opening, which is opposite the first opening, is arranged opposite the valve wall in the valve body, wherein the region in the valve body between these two walls and openings forms the valve interior or the vacuum region of the valve.

A valve seat runs around the opening in the valve wall. The valve seat is generally understood functionally to be a portion in the valve wall acting as a sealing surface and against which a further surface acting as a sealing surface may bear. The valve seat preferably points perpendicularly into the interior of the valve body and in particular lies in a geometric plane which is passed through perpendicularly by the geometric opening axis.

The opening can be closed by means of a closure plate. The closure plate, for example, has a rectangular cross section and a closure side for closing the opening in a substantially gas-tight manner. The dimensions of the closure plate make it possible to close the opening by overlapping the opening and by producing a gas-tight contact between the closure plate and the valve seat. In a possible embodiment, a ring seal for pressing against the valve seat is fixed to the edge of the closure side.

The closure plate is carried by at least one valve rod. In other words, the closure plate is arranged on at least one valve rod (for improved stability of the closure plate, preferably on two or more valve rods extending in parallel). The at least one valve rod preferably extends parallel to a longitudinal axis of the vacuum slide gate valve. The closure plate can be arranged rigidly on the at least one valve rod, in particular such that it can be dismantled, or also such that it can be moved. A possibility for movement, in particular in the form of a possibility for pivoting, for example in the form of a ball-and-socket joint between the valve rods and the closure plate, for example may be advantageous for an adjustment or adaptation of the alignment of the closure plate.

A drive unit is coupled to the at least one valve rod. Generally speaking, this drive unit is formed in such a way that the closure plate, by displacing the at least one valve rod in a longitudinal closing direction, substantially along the geometric longitudinal axis, is displaceable from an open position into an intermediate position and back again, against the longitudinal closing direction. In the open position, the closure plate releases the opening since it is located completely or partially outside the projection region of the opening. In the intermediate position, the closure plate covers the opening and is thus located in the projection region of the opening, wherein the closure side is located opposite the valve seat at a distance therefrom. The closure plate is displaced along the longitudinal axis, that is to say in particular transverse to the opening. In addition, the drive unit is formed, generally speaking, in such a way that the closure plate, by displacing the at least one valve rod in a transverse closing direction, substantially along a geometric transverse axis running at right angles to the longitudinal axis, is displaceable from the intermediate position into a closing position and back again, against the transverse closing direction. In the closing position, the closure side of the closure plate is pressed substantially perpendicularly against the valve seat, such that the closure side closes the opening in a substantially gas-tight manner. The closure plate is displaced along the transverse axis, that is to say in particular perpendicular to the opening.

In other words, the drive unit is formed in such a way that the at least one valve rod with the closure plate can perform an L-shaped movement on the one hand along the geometric longitudinal axis between an open position and an intermediate position, and on the other hand along the geometric transverse axis, running at right angles to the longitudinal axis, between the intermediate position and the closing position.

The longitudinal axis preferably runs perpendicular to the opening axis and lies in a plane that is passed through perpendicularly by the opening axis, wherein the transverse axis extends parallel to the opening axis.

The direction of displacement of the at least one valve rod with the closure plate along the longitudinal axis from the open position into the intermediate position is referred to as the longitudinal closing direction, whereas the opposite direction of displacement from the intermediate position into the open position is defined as the reverse longitudinal closing direction. The direction of displacement from the intermediate position into the closing position is also referred to as the transverse closing direction, and the direction of displacement from the closing position into the intermediate position is referred to as the reverse transverse closing direction.

The valve body has a vacuum region and, outside this vacuum region, a drive region. The opening, the valve seat, the closure plate and the portion located there of the at least one valve rod are arranged in the vacuum region. The vacuum region is thus the region of the valve through which the medium that flows through the opening or that bears inwardly against the closure plate flows or enters.

The vacuum region and the drive region are separated from one another in a substantially gas-tight manner. The at least one valve rod is passed through at least one gas-tight aperture in the valve body from the vacuum region into the drive region. This aperture is formed in such a way that the at least one valve rod is movable along the longitudinal axis between the open position and the intermediate position and along the transverse axis between the intermediate position and the closing position. An aperture of this type for example can be formed by a diaphragm seal, which enables an axial and radial movability of the valve rod to be sealed, or also by at least one bellows. The drive unit and the portion located there of the at least one valve rod are arranged in the drive region. A significant advantage of the arrangement of the drive unit in the drive region outside the vacuum region is that the friction particles produced unavoidably by the drive unit do not reach the sensitive vacuum region. The number of particles in the vacuum region is thus kept low.

The at least one valve rod is rigidly connected to a sliding part of the drive unit, said sliding part being arranged in the drive region. In other words, a slidably mounted sliding part is arranged in the drive region, the connecting rod being fixed on said sliding part or the plurality of valve rods being fixed on said sliding part, such that a movement of the sliding part leads to a corresponding movement of the at least one valve rod during normal operation of the valve.

The sliding part, by means of a guide which is associated with the drive unit and which is arranged in the drive region, is displaceable between a first position and a second position and also between the second position and a third position.

In the first position of the sliding part, which is coupled via the at least one valve rod to the closure plate, the closure plate is located in the open position, whereas, in the second position of the sliding part, the closure plate is located in the intermediate position. In the third position of the sliding part, the closure plate is located in the closing position.

Between the first position and the second position, the sliding part, by means of the guide, is guided non-pivotably, parallel to the longitudinal axis, and is slidable along the longitudinal axis. In other words, the sliding part, by means of the guide, is forcibly guided linearly between the first and second position in such a way that there is exclusively a translatory degree of freedom parallel to the longitudinal axis between the first and second position. This translatory degree of freedom is limited however in the longitudinal closing direction in the case of the second position, since the guide is formed in such a way that a further sliding of the sliding part in the longitudinal closing direction is blocked once the second position has been reached.

Between the second position and the third position, in which the closure plate is located in the closing position, the sliding part, by means of the guide, is guided non-pivotably, parallel to the transverse axis, and is slidable along the transverse axis. In other words, the sliding part, by means of the guide, is forcibly guided linearly between the second and third position in such a way that there is exclusively a translatory degree of freedom between the second and third position, parallel to the transverse axis.

In other words, the guide causes an L-shaped linear guidance of the sliding part along the longitudinal axis and the transverse axis. Specific embodiments of such a guidance are documented by further aspects of the invention.

The drive unit has a linear actuator with a displacement member linearly displaceable parallel to the longitudinal axis. Such a linear actuator, in other words a linear drive, can be formed by at least one mechanical drive, such as a spindle drive, a roller screw drive, a ball screw drive, a scissor drive, and also a piston-cylinder unit, such as a pneumatic drive, a hydraulic cylinder, and also an electromechanical linear drive or another suitable drive. Different linear actuators are known from the prior art. The displacement member, in the case of a spindle drive, may comprise a spindle nut in particular.

The displacement member is mechanically coupled to the sliding part via an inclined connection. This inclined connection is formed in such a way that the displacement member, when linearly displaced in the longitudinal closing direction, exerts a force, which is directed at an incline with respect to the longitudinal closing direction, onto the sliding part with force components in the longitudinal closing direction and in the transverse closing direction, such that the sliding part forcibly guided in an L-shaped manner can be displaced from the first position into the second position and from the second position into the third position. The inclined connection is therefore formed in such a way that, by means of the linear displacement of the displacement member in the longitudinal closing direction with the sliding part blocked in the longitudinal closing direction in the second position, the sliding part is slid in the transverse closing direction into the third position.

In a development of the invention, the described guide has a link guide. This link guide in particular has a guide part, which is connected by means of a pivot bearing to the sliding part pivotably about a geometric sliding part axis. This geometric sliding part axis runs at right angles to the longitudinal axis and lies in a plane with respect to which the transverse axis forms a geometric normal. The geometric sliding part axis thus also lies in a geometric plane with respect to which the longitudinal axis forms a geometric normal. In addition, the link guide has a first guide path, in which a first guide member of the guide part is guided, and a second guide path, in which a second guide member of the guide part is guided. The guide part in particular extends at least in part along the longitudinal axis. The guide part additionally extends between the first guide path and the second guide path, in which the respective guide member of the guide part is guided. The guide members are offset with respect to one another in the longitudinal closing direction.

The first and the second guide path may also each be formed by a plurality of guide paths, in particular mutually opposed guide path pairs. For example, the two guide paths each consist of two mutually opposed guide paths, in particular formed from slots, which are formed in two parallel surfaces, which are arranged opposite one another and between which the guide part and the sliding part extend parallel to the sliding part axis, wherein the sliding part axis in particular forms a geometric normal with respect to these parallel surfaces. The guide members are formed for example by rollers, which roll along in the guide paths, in particular in the slots. The guide paths run in such a way that the sliding part axis of the sliding part is guided from the first position into the second position parallel to the longitudinal axis and from the second position into the third position parallel to the transverse axis. There are different combinations of courses of two guide paths, which cause an L-shaped forced guidance of this type of the geometric sliding part axis.

A particularly simple and advantageous course of the guide paths will be described hereinafter. The first guide path, in particular the mutually opposed first guide path pair, runs linearly parallel to the longitudinal axis. In particular, the first guide path is formed by a slot running in a straight line. The second guide path, in particular the second guide path pair, is composed of a guide path portion likewise running in a straight line and of a bent guide path portion, in particular formed from corresponding slots. The straight guide path portion, in particular the straight guide path portion pair, runs linearly parallel to the longitudinal axis with a linear extension, which corresponds to the linear extension of the first guide path. In other words, the straight guide path portion is just as long as the first guide path. The bent guide path portion extends substantially in or against the transverse closing direction.

This bent guide path portion can be formed by a circular arc, which for example intersects the straight guide portion in particular at right angles and of which the geometric midpoint lies on a geometric axis which is parallel to the sliding part axis and which in particular runs through the first guide member in the second position of the sliding part. In this case, the sliding part, when displaced from the second position into the third position, pivots about this geometric axis of the first guide member. The displacement from the second into the third position, and hereby also the displacement of the closure plate from the intermediate position into the closing position, therefore not only results in a displacement in the transverse closing direction however, but also in a slight displacement in or against the longitudinal closing direction. This effect can be produced by shifting the geometric midpoint and, depending on the relative sizes, is to some extent so low that a quasi-linear transverse movement can be assumed.

It is possible however to select the geometry of the guide portions in such a way that, with the displacement between the second and third position, a geometric linear movement in a straight line actually occurs at right angles to the longitudinal axis and perpendicularly toward the valve seat. This can be produced in particular in that the bent guide path portion has the form of an arc segment of a geometric ellipse. The geometric first ellipse axis of this ellipse lies on the first guide path, whereas the geometric second ellipse axis lies on a geometric straight line parallel to the transverse axis and extending between the second position and the third position of the sliding part axis. The first and second ellipse axes are to be understood to mean the geometric primary axis and the secondary axis respectively, or vice versa. Depending on the selected dimensions, the bent guide path portion having the geometry of an arc segment of a geometric ellipse has a quasi circular-arc-like form however, in such a way that the deviation between the elliptical and circular arc form is very small and lies within the manufacturing or guide tolerances. This is dependent however in particular on the length of the guide part and the length of the displacement path between the second and third position.

In a development of the invention, the inclined connection, which mechanically couples the displacement member to the sliding part, is formed by an inclined surface guide. This inclined surface guide is formed in such a way that a relative sliding between the displacement member and the sliding part is enabled along a geometric inclined axis. In particular, the displacement member and the sliding part are mounted by means of a linear bearing so as to be linearly displaceable relative to one another along the inclined axis. This geometric inclined axis runs at an incline with respect to the longitudinal axis in the plane in which the longitudinal axis and transverse axis lie. The geometric inclined axis lies at an incline with respect to the longitudinal axis in such a way that the sliding part is displaceable by means of the relative sliding from the second position into the third position by the linear actuator. In other words, the linear movement of the adjustment member along the longitudinal axis in the longitudinal closing direction with the sliding part fixed in the longitudinal closing direction is kinematically converted by the sliding of the sliding part and of the displacement member relative to one another into a transverse movement of the sliding part along the transverse axis in the transverse closing direction.

In a special development, the inclined surface guide is formed by an inclined surface on the sliding part, said inclined surface pointing at an incline in the direction against the transverse closing direction and against the longitudinal direction, and also by rollers arranged on the displacement member. These rollers span a geometric area corresponding to the inclined surface and roll over the inclined surface in the direction along the inclined axis. These rollers are preferably arranged offset from one another along the inclined axis, such that, by resting and rolling the rollers over the inclined surface, a linear bearing along the inclined axis is formed. In particular, further rollers are also arranged offset from one another parallel to the sliding part axis. For example, four rollers are provided, which together span a geometric rectangular area. By means of this linear bearing, the sliding part is guided parallel to the longitudinal axis and parallel to the transverse axis and has two corresponding translatory degrees of freedom. So that the described inclined surface guide acts in both directions, that is to say not only when the displacement member is displaced in the longitudinal closing direction, but also when the displacement member is displaced against the longitudinal closing direction, the following development is possible. The sliding part has an undercut surface, which points in a direction opposite the inclined surface. The displacement member has return rollers, which roll over the undercut surface. When the displacement member is displaced against the longitudinal closing direction, the sliding part can thus be displaced back from the third position into the second position and in particular also from the second position into the first position. Instead of the preferred roller arrangement, it is also possible to use other driver elements, in particular also springs, which couple the sliding part to the displacement member in the opposite direction.

In accordance with a development of the invention, between the sliding part and the displacement member, a driver acting there is arranged in such a way that the relative sliding when the displacement member is displaced from the third position into the second position against the longitudinal closing direction by the linear actuator is limited. This, when the displacement member is displaced against the longitudinal closing direction, starting from the third position of the sliding part or the closing position, firstly causes a relative sliding of the displacement member relative to the sliding part along the inclined axis, in particular via the above-mentioned roller guide, such that the sliding part is slid against the transverse closing direction parallel to the transverse axis until the driver delimits this sliding motion along the inclined axis. The sliding part is thus linearly slid by the displacement member, due to the action of the driver, in the reverse longitudinal closing direction from the second position, that is to say the intermediate position, into the first position, that is to say the open position. The sequence of movements from the open position into the closing position of the closure plate and back is thus performed in the described development of the invention as follows. The sliding part coupled to the closure plate arranged in the open position is located in the first position. The displacement member is arranged in a starting position and is located relative to the sliding part in a position not slid relative to one another. The first guide member is arranged in the linear first guide path, and the second guide member is arranged in the straight guide path portion of the second guide path. The displacement member is then slid linearly by means of the linear actuator in the longitudinal closing direction, wherein the sliding part is guided parallel to the longitudinal axis via the inclined surface guide, and a force directed at an incline with respect to the longitudinal closing direction is exerted onto the sliding part with force components in the longitudinal closing direction and in the transverse closing direction. Since the guide members in this position are both guided in guide paths running linearly and parallel to the longitudinal axis, and the sliding part is forcibly guided along the longitudinal axis, wherein no sliding along the transverse axis is possible, the sliding part is entrained by the displacement member in the longitudinal closing direction, without this resulting in a relative sliding of the displacement member relative to the sliding part on the inclined surface guide, until the intermediate position of the closure plate or the second position of the sliding part is reached. In this second position, in which the displacement member and the sliding part are in a position not slid relative to one another, the displacement member is located in an intermediate position and the second guide member is located in the transition region between the straight guide path portion and the bent guide path portion. The second guide member thus blocks the sliding part in the longitudinal closing direction in this second position, however the sliding part can now be slid in the transverse closing direction in this second position. With further linear displacement of the displacement member along the longitudinal axis in the longitudinal closing direction from the intermediate position in the direction of an end position, the sliding part can no longer be displaced further in the longitudinal closing direction. The rollers of the displacement member then roll over the inclined surface of the sliding part, thus resulting in a relative sliding of the displacement member relative to the sliding part, wherein the second guide member is guided along the bent guide path portion of the second guide path, the guide part is thus pivoted out about the sliding part axis in the pivot bearing, and the sliding part is slid parallel to the transverse axis in the transverse closing direction from the second position into the third position until the closure plate reaches the closing position and rests via its closure side perpendicularly on the valve seat, which runs around the opening, such that the opening is closed in a gas-tight manner. The sliding part and the displacement member are located in the end position or in the third position in a position slid relative to one another.

The closing process is performed in the reverse sequence, wherein, with the linear displacement of the displacement member from the end position into the intermediate position, the return rollers of the displacement member roll over the undercut surface of the sliding part and the sliding part is thus entrained in the reverse transverse closing direction until the position not slid relative to one another, and therefore the second position, is reached. The driver limits the relative sliding of the displacement member relative to the sliding part beyond the non-slid position against the longitudinal closing direction. As the displacement member is displaced further from the intermediate position into the starting position, the sliding part is slid by the displacement member, which is located in the unslid position relative to the sliding part, from the second position into the first position, such that the closure plate is moved from the intermediate position into the open position parallel to the longitudinal axis.

The described inclined surface guide has the advantage that the force component acting in the transverse closing direction, during the linear displacement of the displacement member and during the relative sliding between the displacement member and the sliding part along the inclined axis, remains constant from a geometric viewpoint with constant force components acting in the longitudinal closing direction. The transverse force can thus also be determined by determining the longitudinal force.

In accordance with the invention, the linear actuator may also be equipped with force determination means, by means of which the force acting on the displacement member in and against the longitudinal closing direction can be determined. Furthermore, a controller in signal communication with the force determination means and the linear actuator may be provided and may be formed in such a way that the linear actuator is stopped when a force limit value corresponding to a specific contact pressure of the closure plate on the valve seat is exceeded.

This force acting in the longitudinal closing direction can be determined in the case of a linear actuator formed as an electric spindle drive by determining the current applied across the spindle drive. With a piston-cylinder unit that is pneumatic in particular, this force determination process can be implemented by determining the pressure, which is pneumatic in particular.

Instead of the described inclined surface guide, other inclined connections can also be used however, which are mechanically coupled in such a way that the displacement member, in the event of the linear displacement in the longitudinal closing direction, exerts a force directed at an incline with respect to the longitudinal closing direction onto the sliding part with force components in the longitudinal closing direction and in the transverse closing direction in order to displace the sliding part from the first position into the second position and from the second position into the third position.

For example, in accordance with an aspect of the invention, the inclined connection, which mechanically couples the displacement member to the sliding part, is formed by a parallelogram guide having at least two branches arranged parallel to one another. The at least two branches are each connected pivotably about branch axes to the displacement member and the sliding part. The branch axes each run parallel to the geometric sliding part axis, which runs at right angles to the longitudinal axis and lies in a plane with respect to which the transverse axis forms a geometric normal. The branches are arranged and dimensioned in this case in such a way that, between the first position and the second position, the respective branch axis at the sliding part in the longitudinal closing direction is offset with respect to the respective branch axis at the displacement member. In particular, the branches are also arranged and dimensioned in such a way that, between the second position and the third position, the respective branch axis at the sliding part in the longitudinal closing direction is offset or substantially not offset with respect to the respective branch axis at the displacement member. When the displacement member is displaced in the longitudinal closing direction with the sliding part blocked in the longitudinal closing direction, the branches are thus pivoted out in such a way that the sliding part is displaced in the transverse closing direction. Similarly to the inclined surface guide, the parallelogram guide causes the sliding part to be guided parallel to the longitudinal axis and thus always likewise to be forcibly oriented parallel to the longitudinal axis.

The displacement member linearly displaceable parallel to the longitudinal axis, in a development of the invention, has support rollers. These support rollers point opposite the transverse closing direction and roll over a track connected to the valve body and extending parallel to the longitudinal axis in order to support the displacement member on the valve body in the direction opposite the transverse closing direction. A transverse force opposite the transverse closing direction thus acts directly on the valve body, such that the linear actuator is substantially free from transverse forces.

Furthermore, the invention includes the fact that at least one support part protrudes rigidly from the sliding part in a direction against the longitudinal closing direction, a free end of this support part pointing in a direction against the longitudinal closing direction having a contact surface pointing in the transverse closing direction. The sliding part is arranged between the closure plate and the contact surface. In particular, the sliding part is positioned substantially centrally between the closure plate and contact surface. The contact surface is arranged opposite a support rigidly connected to the valve wall, in such a way that the free end of the support part is supported in the closing position on the support in the transverse closing direction. As described above, as the sliding part is displaced from the second into the third position via the inclined connection, a transverse force in the direction of the transverse closing direction is applied to the sliding part. In the closing position of the closure plate, very high transverse forces act in part on the closure plate and therefore also on the sliding part, both due to the pressing of the closure plate against the valve seat and also owing to pressure differences applied across the valve. In particular, the closure plate, the at least one valve rod, the sliding part, the at least one support part and the contact surface form a movement unit. Due to the described support part, which forms a type of extension of the valve rods, the displacement member is freed from transverse forces, which act against the transverse closing direction, since the mentioned movement unit is supported in the transverse closing direction on account of the lever effect on the support rigidly connected to the valve wall. The at least one support part and the at least one valve rod can be formed integrally in a specific embodiment of the invention, the at least one support part being formed by a portion of the at least one valve rod.

The vacuum slide gate valve according to the invention will be described in greater detail hereinafter on the basis of specific exemplary embodiments illustrated schematically in the drawings, purely by way of example.

DETAILED DESCRIPTION

Figure 1A:
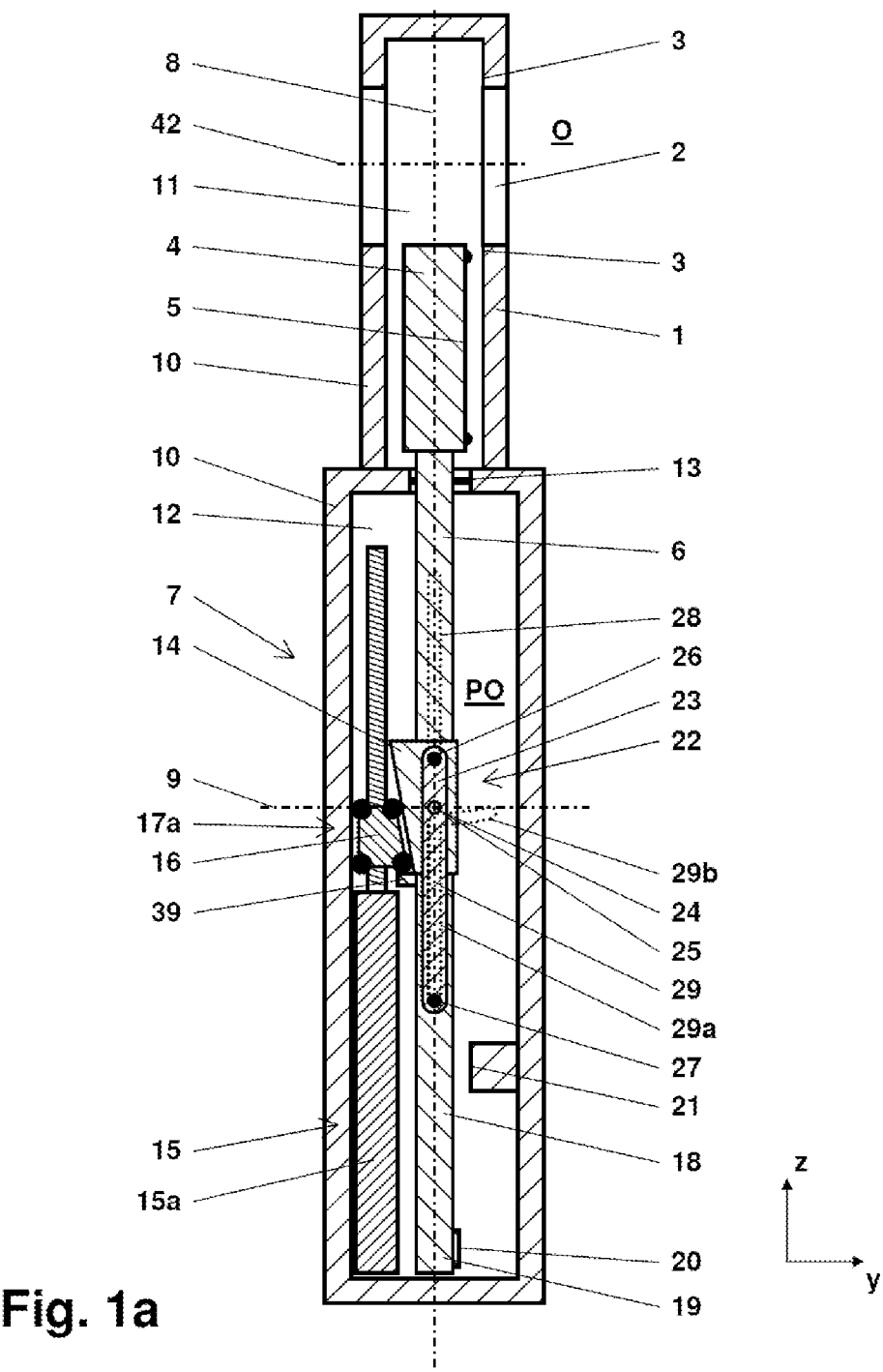
FIG. 1a shows a schematic cross-sectional side view of a first embodiment of a vacuum slide gate valve with an inclined surface guide in an open position of the closure plate.
Figure 1B:
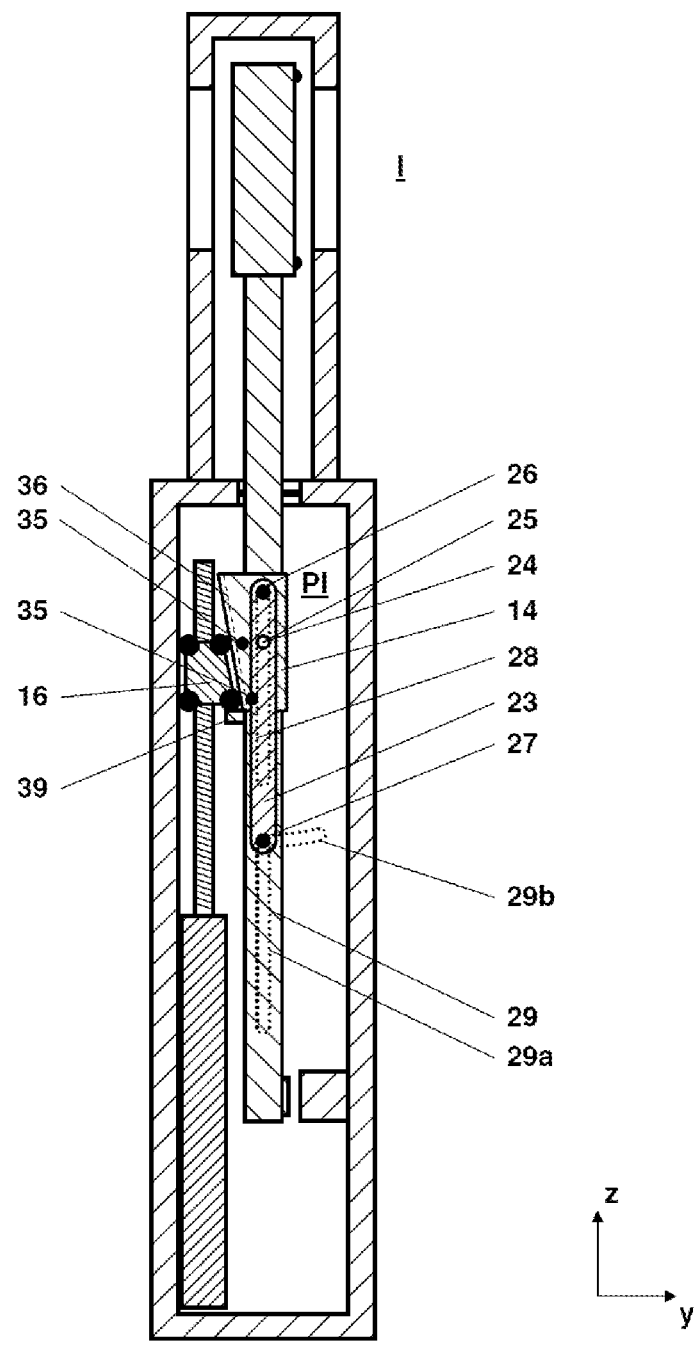
FIG. 1b shows the first embodiment in an intermediate position.
Figure 1C:
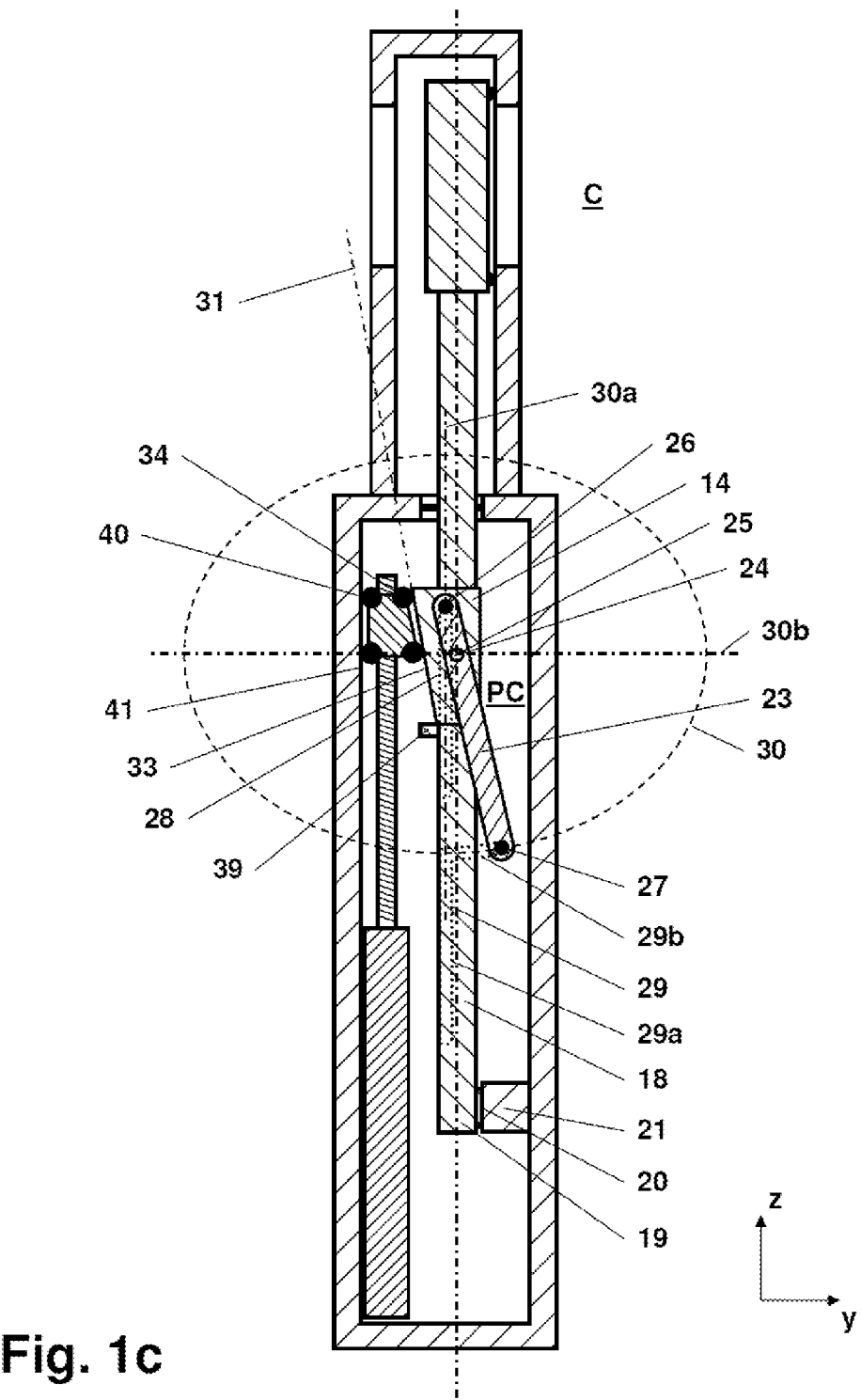
FIG. 1c shows the first embodiment in a closing position.
Figure 2A:
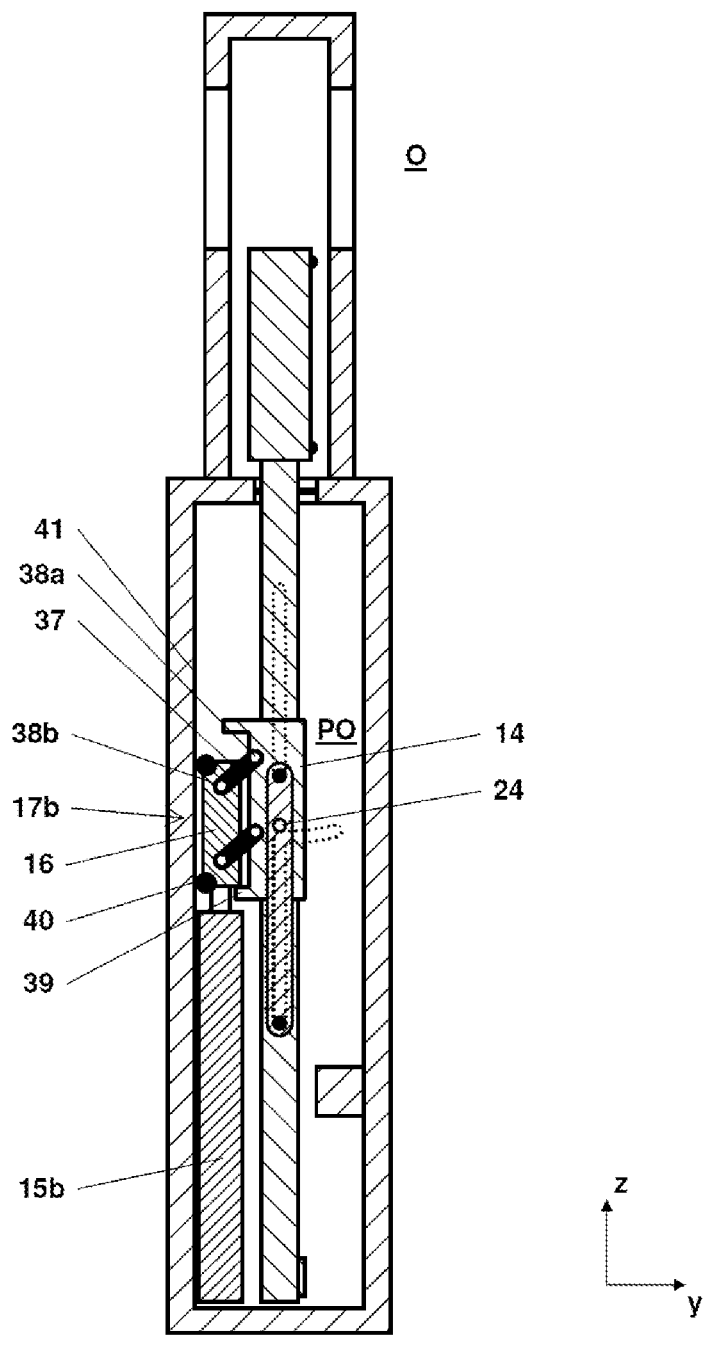
FIG. 2a shows a schematic cross-sectional side view of a second embodiment of a vacuum slide gate valve with a parallelogram guide in an open position of the closure plate.
Figure 2B:
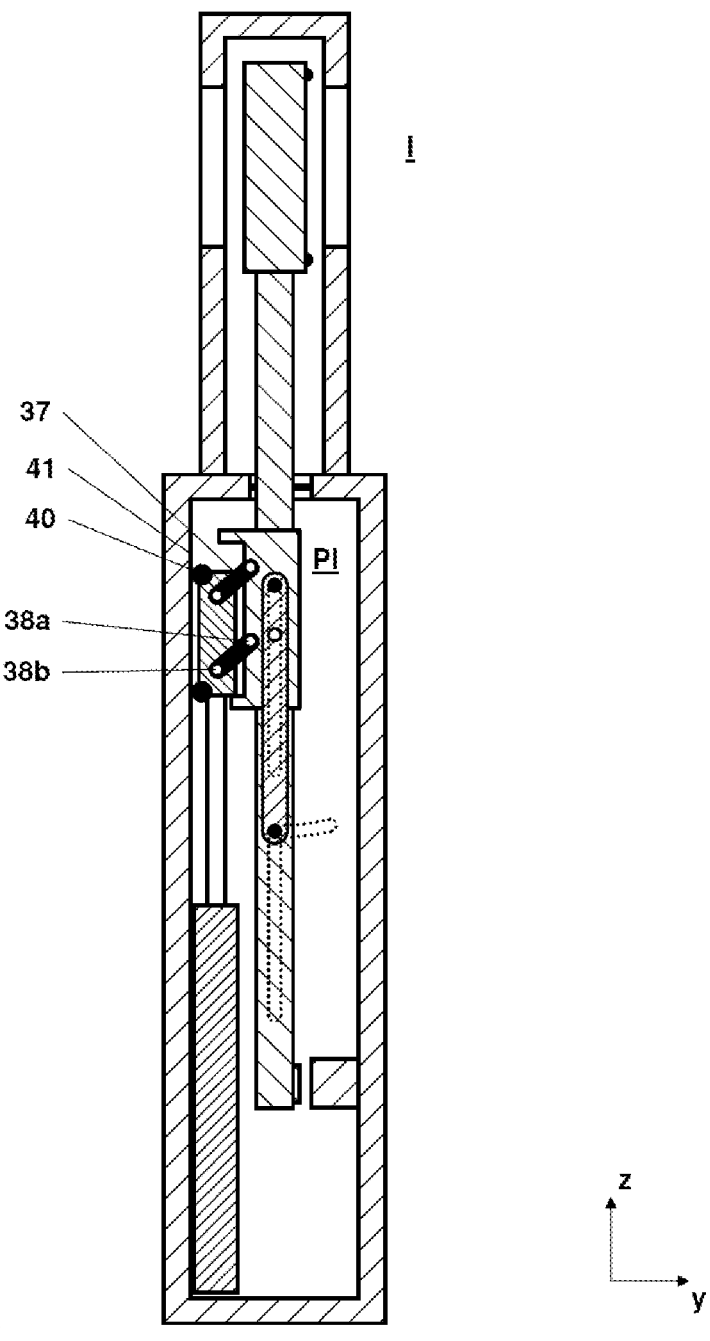
FIG. 2b shows the second embodiment in an intermediate position.
Figure 2C:
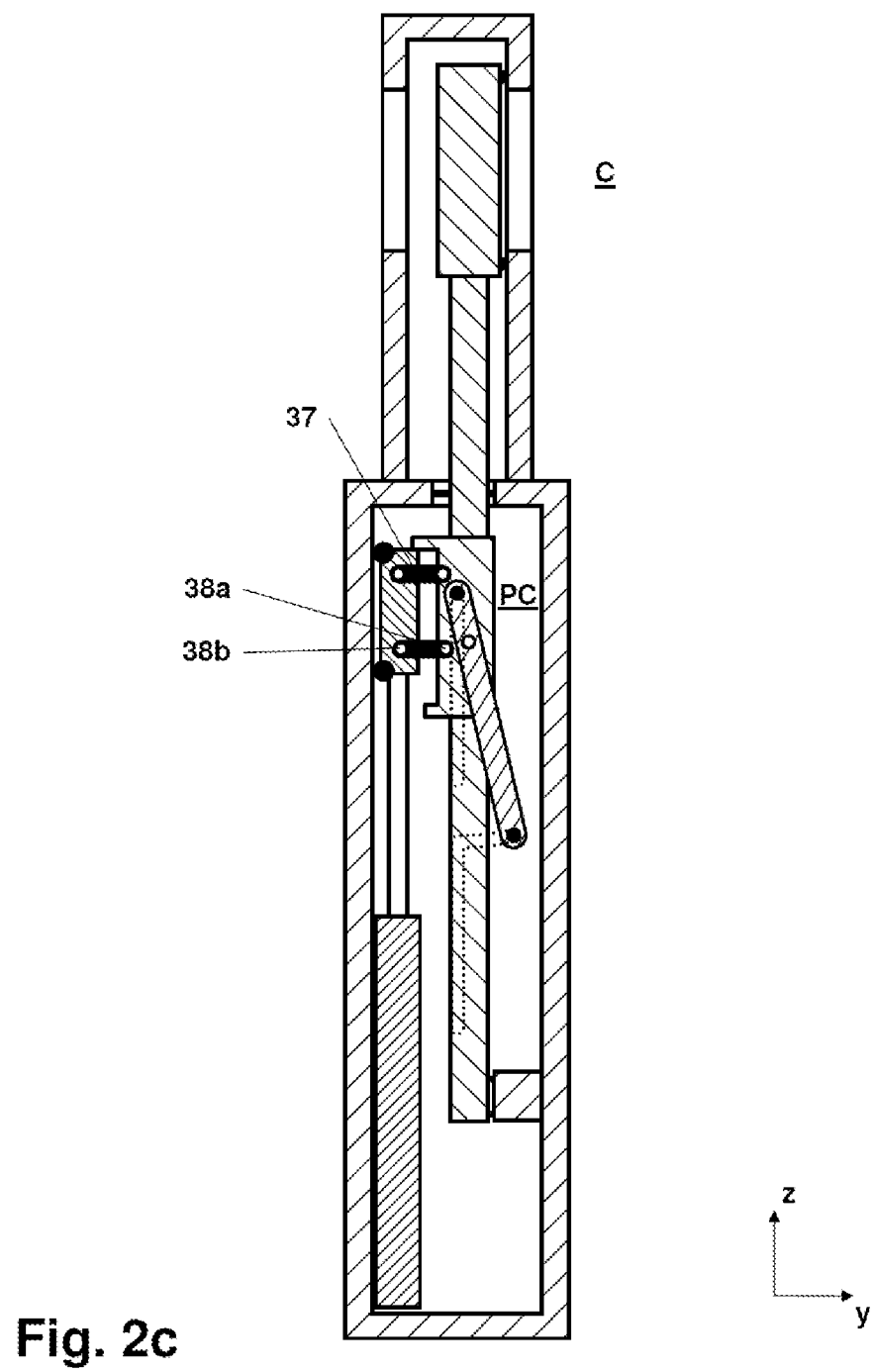
FIG. 2c shows the second embodiment in a closing position.

The group formed from FIGS. 1a, 1b, 1c, 3a and 3b and also the group formed from FIGS. 2a, 2b and 2c each show a common, exemplary embodiment of a vacuum slide gate valve according to the invention in different states, from different perspectives and in different levels of detail. These groups of figures will therefore each be described jointly. The two embodiments differ from one another merely in respect of specific features, as a result of which only the differences between the embodiments will be discussed at times. Sometimes, reference signs and features explained already in previous figures will not be discussed again. In addition, it should be noted that FIGS. 1a to 2c show schematic illustrations in which the component parts are arranged and illustrated differently to some extent from the detailed illustrations in FIGS. 3a and 3b in order to provide a better illustration.

A first embodiment of a vacuum slide gate valve according to the invention is illustrated in FIGS. 1a, 1b, 1c, 3a and 3b. The vacuum slide gate valve has a valve body 10 with a valve wall 1, which has an opening 2 with an opening axis 42 and with an elongated, substantially rectangular valve seat 3 running around the opening 2. A closure plate 4 with a closure side 5, which has a cross section slightly larger than the opening 2, serves to close the opening 2 in a substantially gas-tight manner by pressing the closure side 5 against the valve seat 3. The closure plate 4 is carried by two valve rods 6 arranged parallel to one another. Since the valve rods 6 are aligned in side view in FIGS. 1a to 1c, merely one valve rod 6 can be seen in said figures, whereas both valve rods 6 can be seen in FIG. 3b, which is an oblique view of the vacuum slide gate valve.

The valve body 10 is divided into a vacuum region 11, in which the opening 2, the valve seat 3 and the closure plate 4 are arranged, and a drive region 12, which is arranged outside the vacuum region 11. The two valve rods 6 are passed through two gas-tight apertures 13, which are formed as diaphragm seals, in the valve body 10 from the vacuum region 11 into the drive region 12. The diaphragm seals 13 are formed in such a way that the valve rods 6 can be moved in a certain movement range along a longitudinal axis 8 and a transverse axis 9 whilst maintaining the gas-tight seal. Since the drive region 12 is separated in a gas-tight manner from the vacuum region 11, an atmospheric pressure may prevail in the drive region 12. Friction particles located in the drive region 12 cannot reach the sensitive vacuum region. A drive unit 7 is arranged in the drive region 12.

The drive unit 7, as will be described in greater detail hereinafter, is formed in such a way that the closure plate 4, by displacement of the two valve rods 6 along the geometric longitudinal axis 8, can be displaced in a longitudinal closing direction z from an open position O, FIG. 1a, into an intermediate position I, FIG. 1b, and, by displacement of the two valve rods 6 along the geometric transverse axis 9 running at right angles to the longitudinal axis 8, can be displaced in a transverse closing direction y from the intermediate position I, FIG. 1b, into a closing position C, FIG. 1c, and back.

The drive unit 7 has a linear actuator 15 formed as a spindle drive 15a with a displacement member 16, which is linearly displaceable parallel to the longitudinal axis 8 and which runs over the spindle via a spindle nut.

The two valve rods 6 are rigidly connected to a sliding part 14 of the drive unit 7, said sliding part being arranged in the drive region 12. The sliding part 14 is guided non-pivotably by means of a guide 22 of the drive unit 7 in the drive region 12 between a first position PO, FIG. 1a, and a second position PI, FIG. 1b, parallel to the longitudinal axis 8 and is displaceable along the longitudinal axis 8, and is also guided non-pivotably between the second position PI, FIG. 1b, and a third position PC, FIG. 1c, parallel to the transverse axis 9 and is displaceable along the transverse axis 9. In the first position PO, the closure plate 4 is in the open position O, in which the closure plate 4 releases the opening 2, FIG. 1a. In the second position PI, the closure plate 4 is in the intermediate position I, in which it covers the opening 2, and the closure side 5 is located opposite the valve seat 3 at a distance therefrom, FIG. 1b. In the third position PC, in which the closure plate is in the closing position C, the closure side 5 of the closure plate 4 is pressed perpendicularly against the valve seat 3 and closes the opening 2 in a substantially gas-tight manner, FIG. 1c. The exact design of the guide will be discussed hereinafter in greater detail.

Figure 3A:
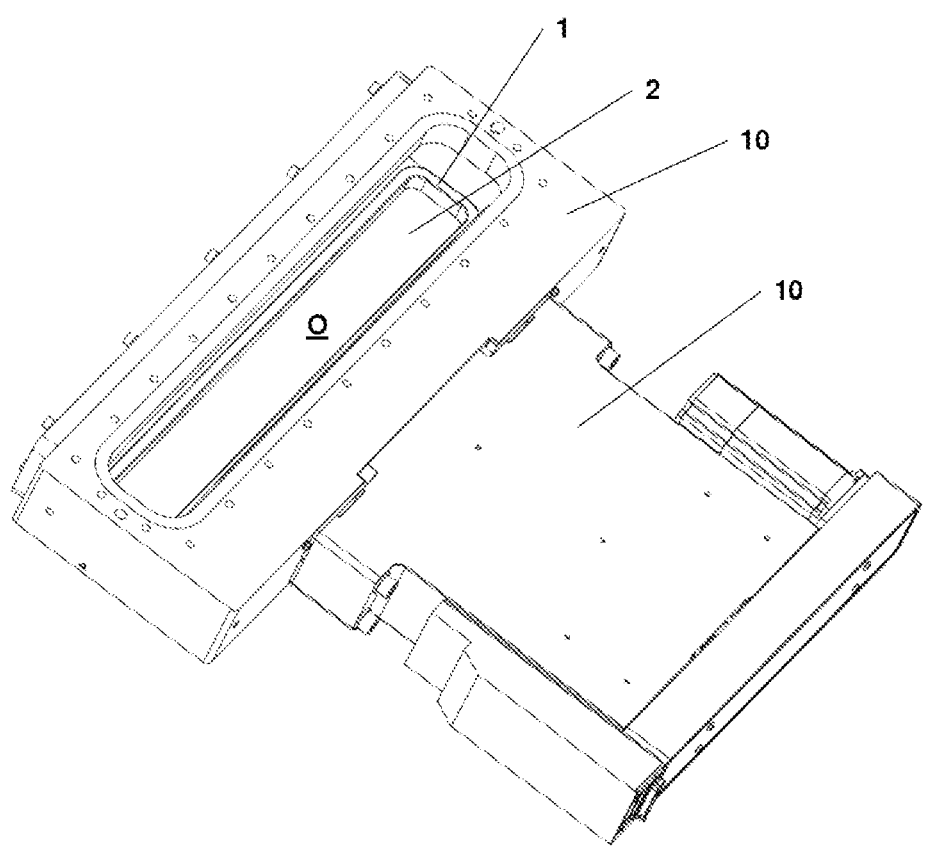
FIG. 3a shows a detailed oblique view of the first embodiment with closed body.
Figure 3B:
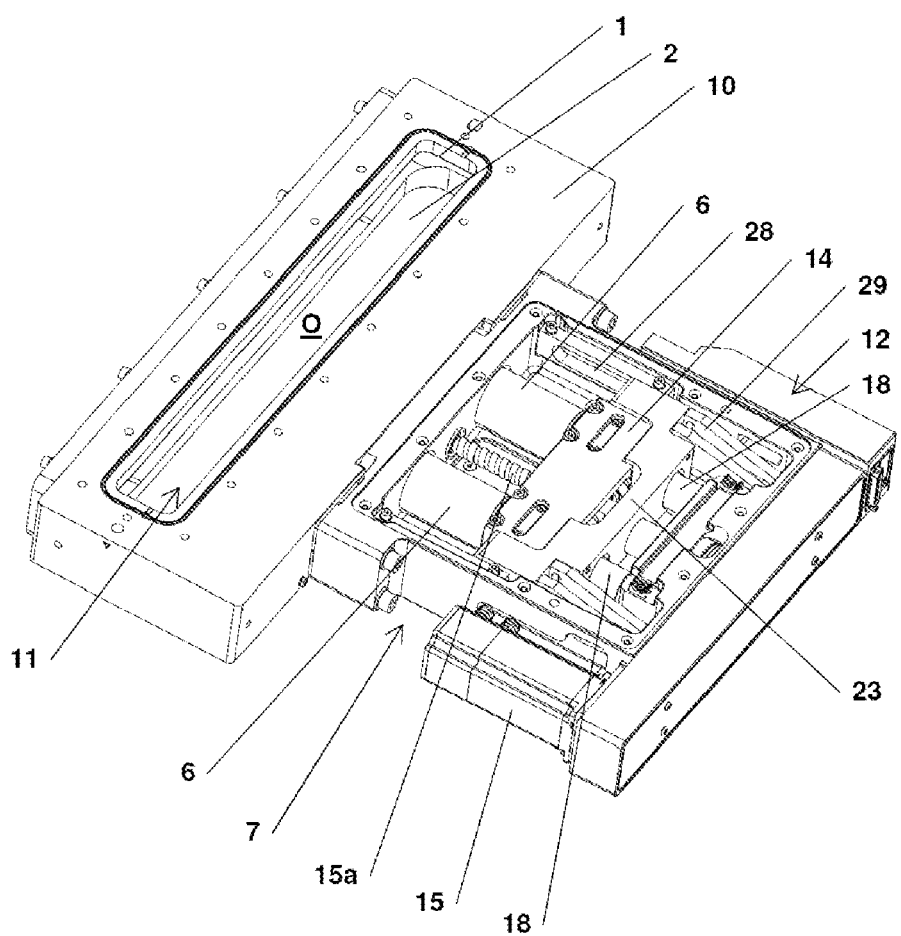
FIG. 3b shows a detailed oblique view of the first embodiment with open body.

The guide has a link guide 22 with a guide part 23 extending substantially parallel to the longitudinal axis 8, said guide part being pivotably connected by means of a pivot bearing 25 in the form of two guide pins being pivotably connected to the sliding part 14 by means of about a geometric sliding part axis 24, which runs at right angles to the longitudinal axis 8 and lies in a plane with respect to which the transverse axis 9 forms a geometric normal. As can be seen in FIG. 3b, the guide part 23 has the form of a yoke. The link guide 22 has two first guide paths 28 and two second guide paths 29. The two valve rods 6, the sliding part 14 and the yoke-like guide part 23 are arranged between the two first guide paths 28 and between the two second guide paths 29, as can be seen in FIG. 3b. The guide part 23, on both sides, has a first guide member 26 in each case in the form of a guide roller. The respective first guide member 26 is guided in the respective first guide path 28. In addition, a second guide member 27, likewise formed as a guide roller, of the guide part 23 is guided in each of the two second guide paths 29. The two first guide members 26 are offset with respect to the two second guide members 27 in the longitudinal closing direction z.

The two first guide paths 28 run exactly parallel to the longitudinal axis 8, as can be seen in FIGS. 1a to 1c with reference to the dashed lines. The second guide paths 29 are each composed of a straight guide path portion 29a and a bent guide path portion 29b. The respective straight guide path portion 29a runs exactly parallel to the longitudinal axis 8 with a linear extension, which corresponds to the linear extension of the first guide path 28. The respective bent guide path portion 29b extends substantially in the transverse closing direction y, as likewise can be seen in FIGS. 1a to 1c. As shown in FIG. 1c, the bent guide path portions 29b each have the form of an arc segment of a geometric ellipse 30, which in each case extends in a plane with respect to which the geometric sliding part axis 24 forms a geometric normal. The geometric first ellipse axis 30a, which is parallel to the longitudinal axis 8, is arranged on the first guide path 28 in side view. In other words, the respective first ellipse axis 30a lies in a plane with respect to which the transverse axis 9 forms a normal and along which the first guide path 28 extends, wherein, in particular, the geometric center axis of the respective first guide path 28 lies in this plane. The geometric second ellipse axis 30b of the respective geometric ellipse 30 lies on a geometric straight line parallel to the transverse axis 9 and extending between the second position PI and the third position PC of the sliding part axis 24. The guide paths 28 and 29 thus run in such a way that the sliding part axis 24 of the sliding part 14 is guided from the first position PO into the second position PI parallel to the longitudinal axis 8, as shown in FIGS. 1a and 1b, and from the second position PI into the third position PC parallel to the transverse axis 9, as shown in FIGS. 1b and 1c.

In the first embodiment in FIGS. 1a to 1c and 3a and 3b, the inclined connection, which mechanically couples the displacement member 16 to the sliding part 14, is formed by an inclined surface guide 17a, such that a relative sliding between the displacement member 16 and the sliding part 14 along a geometric inclined axis 31 is made possible, as is shown in particular in FIG. 1c. The geometric inclined axis 31 runs at an incline with respect to the longitudinal axis 8 in the plane in which the longitudinal axis 8 and the transverse axis 9 lie, and lies at an incline with respect to the longitudinal axis 8 in such a way that the sliding part 14, by means of the relative sliding, is displaceable from the second position PI into the third position PC by means of the linear actuator 15, as shown in FIGS. 1b and 1c. The inclined surface guide 17a is composed of an inclined surface 33 on the sliding part 14, said inclined surface pointing at an incline in the direction against the transverse closing direction y and against the longitudinal closing direction z, and of rollers 34, which are arranged on the displacement member 16, span a geometric area corresponding to the inclined surface 33, and roll over the inclined surface 33 in the direction along the inclined axis 31. In the shown exemplary embodiment, four rollers 34, which span a rectangular area over which the inclined axis 31 is arranged, roll over the inclined surface 33 in a direction parallel to the inclined axis 31.

In addition, the sliding part 14 has an undercut surface 36, which points in a direction opposite the inclined surface 33, specifically at an incline in the transverse closing direction y and the longitudinal closing direction z, as shown exclusively in FIG. 1b for representational reasons. The displacement member 16 has return rollers 35, which roll over the undercut surface 36 in order to displace the sliding part 14 back from the third position PC, FIG. 1c, into the second position PI, FIG. 1b, and also further from the second position PI into the first position PO, FIG. 1a. By means of a driver 39 acting between the sliding part 14 and the displacement member 16, the relative sliding between the displacement member 16 and the sliding part 14 when the displacement member 16 is displaced against the longitudinal closing direction y by the linear actuator 15 from the third position PC into the second position PI is delimited, FIG. 1b.

As shown in FIG. 1c the displacement member 16 linearly displaceable parallel to the longitudinal axis 8 has support rollers 40. These support rollers 40 point opposite the transverse closing direction y and run over a track 41 connected to the valve body 10 and extending parallel to the longitudinal axis 8, such that the displacement member 16 can be supported on the valve body 10 in a direction opposite the transverse closing direction y.

Two support parts 18 protrude rigidly from the sliding part 14 in a direction against the longitudinal closing direction z and are formed integrally with the two valve rods 6, such that the two support parts 18 are each formed by a portion of the two valve rods 6. Each of the two support parts 18 has a free end 19, which points in a direction against the longitudinal closing direction z and on which a contact surface 20 pointing in the transverse closing direction y is located in each case. The sliding part 14 is arranged substantially centrally between the closure plate 4 and the contact surface 20. This contact surface 20, in the second position PI and the third position PC, is arranged opposite a support 21 rigidly connected to the valve wall 1, in such a way that the free end 19 of the support part 18 can be supported in the closing position C on the support 21 in the transverse closing direction y, as shown in FIG. 1c.

The sequence of movements from the open position O, FIG. 1a, into the closing position C, FIG. 1c, of the closure plate 4 will be described hereinafter. The closure plate 4 is in the open position O and the sliding part 14 coupled thereto is in the first position PO, as shown in FIG. 1a. The displacement member 16 is arranged in a starting position and is located relative to the sliding part 16 in a position not slid relative to one another, FIG. 1a. The respective first guide member 26 is arranged in the respective linear first guide path 28, and the respective second guide member 27 is arranged in the respective straight guide path portion 29a of the second guide path 29. The displacement member 16 is now linearly displaced by means of the linear actuator 15 by driving the spindle of the spindle drive 15a in the longitudinal closing direction z, wherein the sliding part 14 is guided parallel to the longitudinal axis 8 via the inclined surface guide 17a and a force directed at an incline with respect to the longitudinal closing direction z is exerted onto the sliding part 14 with force components in the longitudinal closing direction z and in the transverse closing direction y. Since the two first guide members 26 and the two second guide members 27 in this position are both guided in linear guide paths 28 and 29a running parallel to the longitudinal axis 8, and since the sliding part 14 is forcibly guided along the longitudinal axis 8, wherein no sliding along the transverse axis 9 is possible, the sliding part 14 is driven by the displacement member 16 in the longitudinal closing direction z, without causing a relative sliding of the displacement member 16 relative to the sliding part 14 at the inclined surface guide 17a, until the intermediate position I of the closure plate 4 or the second position PI of the sliding part 14 is reached, as is illustrated in FIG. 1b.

In this second position PI, FIG. 1b, in which the displacement member 16 and the sliding part 14 are in a position not slid relative to one another, the displacement member 16 is located in an intermediate position and the second guide member 27 is located in the transition region between the straight guide path portion 29a and the bent guide path portion 29b. The second guide member 27 thus blocks the sliding part 14 in the longitudinal closing direction z in this second position PI, however the sliding part 14 in this second position PI is now displaceable in the transverse closing direction y. With the further linear displacement of the displacement member 16 along the longitudinal axis 8 in the longitudinal closing direction z from the intermediate position in the direction of an end position, transition from FIG. 1b to FIG. 1c, the sliding part 14 can no longer be slid further in the longitudinal closing direction y. The rollers 34 of the displacement member 16 now roll over the inclined surface 33 of the sliding part 14, thus resulting in a relative sliding of the displacement member 16 relative to the sliding part 14, wherein the second guide member 27 is guided along the bent guide path portion 29b of the second guide path 29, the guide part 23 thus pivots relative to the sliding part 14 about the sliding part axis 24 in the pivot bearing 25, and the sliding part 14 is slid parallel to the transverse axis 9 in the transverse closing direction y from the second position PI into the third position PC until the closure plate 4 reaches the closing position C and bears via its closure side 5 perpendicularly on the valve seat 3, which runs around the opening 2, such that the opening 2 is closed in a gas-tight manner, as shown in FIG. 1c. Here, the displacement member 16 is supported via the support rollers 40 on the track 41 in a direction against the transverse closing direction y. The sliding part 14 and the displacement member 16 are located in the end position or in the third position in a state slid relative to one another. In the closing position C, the two support parts 18, which protrude rigidly in a direction against the longitudinal closing direction z, additionally each come to rest on the respective support 21 via the contact surface 20 pointing in the transverse closing direction y. The respective free end 19 of the support part 18 is thus supported on the support 21 in the transverse closing direction y in the closing position C. By means of this support 21, an increased level of stability is achieved, such that the closure plate 4 can be exposed to a high transverse stress.

The closing process is carried out in the reverse sequence, wherein, as the displacement member 16 is linearly displaced from the end position into the intermediate position, the return rollers 35 of the displacement member 16 roll over the undercut surface 36 of the sliding part 14, and the sliding part 14 is thus entrained in the opposite transverse closing direction y, until the state not slid relative to one another and therefore the second position PI is reached. The driver 39 delimits the relative sliding of the displacement member 16 relative to the sliding part 14 beyond the unslid state against the longitudinal closing direction z, as shown in FIG. 1b. As the displacement member 16 is displaced further from the intermediate position into the starting position, the sliding part 14 is slid by the displacement member 16, which is in the state not slid relative to the sliding part 14, from the second position PI into the first position PO, FIG. 1a, such that the closure plate 4 is moved from the intermediate position I into the open position O parallel to the longitudinal axis 8, as shown in FIG. 1a.

A second embodiment of the invention is illustrated in FIGS. 2a to 2c and differs from the first embodiment in that, instead of a spindle drive 15a, a piston-cylinder unit 15b is used as a linear actuator 15 for linear displacement of the displacement member 16, and the inclined connection mechanically coupling the displacement member 16 to the sliding part 14 is formed by a parallelogram guide 17b instead of by an inclined surface guide 17a. Merely these differences will therefore be discussed hereinafter, wherein common features already explained previously will not be described again.

The parallelogram guide 17b has two branch pairs 37, which are arranged parallel to one another and are each connected pivotably about a first branch axis 38a and a second branch axis 38b to the displacement member 16 and the sliding part 14. The displacement member 16 displaceable by means of the piston-cylinder unit 15b along the longitudinal axis 8 is guided by means of support rollers 40 along a track 41 and is supported there opposite the transverse direction y. The branch axes 38a and 38b each run parallel to the geometric sliding part axis 24, which runs at right angles to the longitudinal axis 8 and lies in a plane with respect to which the transverse axis 9 forms a geometric normal. The branches 37 are arranged in the first position PO and the second position PI at an incline in such a way that, between the first position PO and the second position PI, the respective first branch axis 38a at the sliding part 14 is offset in the longitudinal closing direction z with respect to the respective second branch axis 38b at the displacement member 16. The branches are arranged and dimensioned in such a way that, between the second position PI and the third position PC, the respective first branch axis 38a at the sliding part 14 in the longitudinal closing direction z is offset, or, as shown in FIG. 2c in the third position PC, is substantially not offset with respect to the respective second branch axis 38b at the displacement member 16. As the displacement member 16 is displaced in the longitudinal closing direction z with the sliding part 14 blocked in the longitudinal closing direction z, the branches 37 are thus pivoted out in such a way that the sliding part 14 is displaced in the transverse closing direction y. Similarly to the inclined surface guide 17a, the parallelogram guide 17b causes the sliding part 14 to be guided parallel to the longitudinal axis 8 and therefore always likewise to be forcibly oriented parallel to the longitudinal axis 8, as shown in FIGS. 2a to 2c.

An advantage of the parallelogram guide 17b compared with the inclined surface guide 17a is that the return rollers 35 can be omitted, since the parallelogram guide 17b is effective both in the transverse closing direction y and in the opposite direction. In addition, by means of an arrangement of the branch axes 38a and 38b in the third position PC, in which said branch axes are substantially not offset, as shown in FIG. 2c, a self-blocking or a locking of the closure plate 4 can be realized. By contrast, an advantage of the inclined surface guide 17a is that the longitudinal force and the transverse force are proportional to one another, such that, by determining the longitudinal force at the displacement member 16, it is possible to come to a precise conclusion regarding the transverse force prevailing at the closure plate 4.

What is claimed is:

1. A vacuum slide gate valve comprising:
a valve wall, which has an opening and a valve seat running around the opening
a closure plate with a closure side for closing the opening in a substantially gas-tight manner,
at least one valve rod carrying the closure plate,
a drive unit, which is coupled to the at least one valve rod and which is formed in such a way that the closure plate:
  by displacing the at least one valve rod in a longitudinal closing direction, substantially along a geometric longitudinal axis, is displaceable from an open position, in which the closure plate releases the opening, into an intermediate position, in which the closure plate covers the opening and the closure side is arranged opposite the valve seat at a distance therefrom; and
  by displacing the at least one valve rod in a transverse closing direction, substantially along a geometric transverse axis running at right angles to the longitudinal axis, is displaceable from the intermediate position into a closing position, in which the closure side of the closure plate is pressed substantially perpendicularly against the valve seat and closes the opening in a substantially gas-tight manner, and back again; and
a valve body having a vacuum region, in which the opening, the valve seat and the closure plate are arranged, the at least one valve rod being guided movably along the longitudinal axis and the transverse axis through at least one gas-tight aperture in the valve body from the vacuum region into a drive region, which is arranged outside the vacuum region and in which the drive unit is arranged, wherein:
the at least one valve rod is rigidly connected to a sliding part of the drive unit, said sliding part being arranged in the drive region;
the sliding part, by means of a guide of the drive unit in the drive region:
  is guided non-pivotably, parallel to the longitudinal axis, between a first position, in which the closure plate is in the open position, and a second position, in which the closure plate is in the intermediate position, and is slidable along the longitudinal axis, the guide blocking a further sliding of the sliding part in the longitudinal closing direction once the second position has been reached, and
  is guided non-pivotably, parallel to the transverse axis, between the second position and a third position, in which the closure plate is in the closing position, and is slidable along the transverse axis,
the drive unit has a linear actuator with a displacement member linearly displaceable parallel to the longitudinal axis,
the displacement member is mechanically coupled to the sliding part via an inclined connection, in such a way that:
  the displacement member, when linearly displaced in the longitudinal closing direction, exerts a force, which is directed at an incline with respect to the longitudinal closing direction, onto the sliding part with force components in the longitudinal closing direction and in the transverse closing direction in order to displace the sliding part from the first position into the second position and from the second position into the third position, and,
  by means of the linear displacement of the displacement member in the longitudinal closing direction with the sliding part blocked in the longitudinal closing direction in the second position, the sliding part is slid in the transverse closing direction into the third position,
the inclined connection, which mechanically couples the displacement member to the sliding part, is formed by an inclined surface guide so as to enable a relative sliding between the displacement member and the sliding part along a geometric inclined axis, which runs at an incline with respect to the longitudinal axis in the plane in which the longitudinal axis and transverse axis lie,
the geometric inclined axis lies at an incline with respect to the longitudinal axis in such a way that the sliding part is displaceable by means of the relative sliding from the second position into the third position by the linear actuator,
the inclined surface guide is formed by:
  an inclined surface on the sliding part, said inclined surface pointing at an incline in the direction against the transverse closing direction and against the longitudinal closing direction, and
  rollers, which are arranged on the displacement member, span a geometric area corresponding to the inclined surface and roll over the inclined surface in the direction along the inclined axis,
the sliding part has an undercut surface, which points in a direction opposite the inclined surface, and
the displacement member has return rollers, which roll over the undercut surface in order to displace the sliding part back from the third position into the second position by the linear actuator.

2. The vacuum slide gate valve according to claim 1, wherein the guide has a link guide.

3. The vacuum slide gate valve according to claim 2, wherein:
the link guide has:
  a guide part, which is connected by means of a pivot bearing to the sliding part pivotably about a geometric sliding part axis, which runs at right angles to the longitudinal axis and lies in a plane with respect to which the transverse axis forms a geometric normal,
  a first guide path, in which a first guide member of the guide part is guided, and
  a second guide path, in which a second guide member of the guide part is guided, and
  the guide members are offset with respect to one another in the longitudinal closing direction, and the guide paths running in such a way that the sliding part axis of the sliding part is guided from the first position into the second position parallel to the longitudinal axis and from the second position into the third position parallel to the transverse axis.

4. The vacuum slide gate valve according to claim 3, wherein:

the first guide path runs linearly parallel to the longitudinal axis, the second guide path is composed of a straight guide path portion and from a bent guide path portion, the straight guide path portion runs linearly parallel to the longitudinal axis with a linear extension, which corresponds to the linear extension of the first guide path, and the bent guide path portion extends substantially in or against the transverse closing direction.

5. The vacuum slide gate valve according to claim 4, wherein:

the bent guide path portion has the form of an arc segment of a geometric ellipse, of which a geometric first ellipse axis of the geometric ellipse lies on the first guide path, and of which a geometric second ellipse axis of the geometric ellipse lies on a geometric straight line parallel to the transverse axis and extending between the second position and the third position of the sliding part axis.

6. The vacuum slide gate valve according to claim 1, wherein:

a driver, which acts between the sliding part and the displacement member and which is arranged in such a way that the relative sliding when the displacement member is displaced from the third position into the second position against the longitudinal closing direction by the linear actuator is delimited.

7. The vacuum slide gate valve according to claim 1, wherein:

the displacement member linearly displaceable parallel to the longitudinal axis has support rollers, which point opposite the transverse closing direction and which roll over a track connected to the valve body and extending parallel to the longitudinal axis, in order to support the displacement member on the valve body in the direction opposite the transverse closing direction.

8. The vacuum slide gate valve according to claim 1, wherein:

the linear actuator is formed as a spindle drive.

9. The vacuum slide gate valve according to claim 1, wherein:

the return rollers of the displacement member rolls over the undercut surface in order to displace the sliding part back from the third position into the second position and from the second position into the first position-by the linear actuator.

10. A vacuum slide gate valve comprising:

a valve wall, which has an opening and a valve seat running around the opening a closure plate with a closure side for closing the opening in a substantially gas-tight manner, at least one valve rod carrying the closure plate, a drive unit, which is coupled to the at least one valve rod and which is formed in such a way that the closure plate:

by displacing the at least one valve rod in a longitudinal closing direction, substantially along a geometric longitudinal axis, is displaceable from an open position, in which the closure plate releases the opening, into an intermediate position, in which the closure plate covers the opening and the closure side is arranged opposite the valve seat at a distance therefrom; and by displacing the at least one valve rod in a transverse closing direction, substantially along a geometric transverse axis running at right angles to the longitudinal axis, is displaceable from the intermediate position into a closing position, in which the closure side of the closure plate is pressed substantially perpendicularly against the valve seat and closes the opening in a substantially gas-tight manner, and back again; and a valve body having a vacuum region, in which the opening, the valve seat and the closure plate are arranged, the at least one valve rod being guided movably along the longitudinal axis and the transverse axis through at least one gas-tight aperture in the valve body from the vacuum region into a drive region, which is arranged outside the vacuum region and in which the drive unit is arranged, wherein:

the at least one valve rod is rigidly connected to a sliding part of the drive unit, said sliding part being arranged in the drive region;

the sliding part, by means of a guide of the drive unit in the drive region:

is guided non-pivotably, parallel to the longitudinal axis, between a first position, in which the closure plate is in the open position, and a second position, in which the closure plate is in the intermediate position, and is slidable along the longitudinal axis, the guide blocking a further sliding of the sliding part in the longitudinal closing direction once the second position has been reached, and is guided non-pivotably, parallel to the transverse axis, between the second position and a third position, in which the closure plate is in the closing position, and is slidable along the transverse axis, the drive unit has a linear actuator with a displacement member linearly displaceable parallel to the longitudinal axis, the displacement member is mechanically coupled to the sliding part via an inclined connection, in such a way that:

the displacement member, when linearly displaced in the longitudinal closing direction, exerts a force, which is directed at an incline with respect to the longitudinal closing direction, onto the sliding part with force components in the longitudinal closing direction and in the transverse closing direction in order to displace the sliding part from the first position into the second position and from the second position into the third position, and, by means of the linear displacement of the displacement member in the longitudinal closing direction with the sliding part blocked in the longitudinal closing direction in the second position, the sliding part is slid in the transverse closing direction into the third position, the inclined connection, which mechanically couples the displacement member to the sliding part, is formed by a parallelogram guide having at least two branches arranged parallel to one another, the at least two branches are each connected pivotably about branch axes to the displacement member and the sliding part, the branch axes each run parallel to a geometric sliding part axis, which runs at right angles to the longitudinal axis and lies in a plane with respect to which the transverse axis forms a geometric normal, and the branches are arranged and dimensioned in such a way that, between the first position and the second position, the respective branch axis at the sliding part in the longitudinal closing direction is offset with respect to the respective branch axis at the displacement member.

11. The vacuum slide gate valve according to claim 10, wherein:
the linear actuator is formed as a piston-cylinder unit.

12. The vacuum slide gate valve according to claim 10, wherein:
the displacement member linearly displaceable parallel to the longitudinal axis has support rollers, which point opposite the transverse closing direction and which roll over a track connected to the valve body and extending parallel to the longitudinal axis, in order to support the displacement member on the valve body in the direction opposite the transverse closing direction.

13. A vacuum slide gate valve comprising:
a valve wall, which has an opening and a valve seat running around the opening
a closure plate with a closure side for closing the opening in a substantially gas-tight manner,
at least one valve rod carrying the closure plate,
a drive unit, which is coupled to the at least one valve rod and which is formed in such a way that the closure plate:
   by displacing the at least one valve rod in a longitudinal closing direction, substantially along a geometric longitudinal axis, is displaceable from an open position, in which the closure plate releases the opening, into an intermediate position, in which the closure plate covers the opening and the closure side is arranged opposite the valve seat at a distance therefrom; and
   by displacing the at least one valve rod in a transverse closing direction, substantially along a geometric transverse axis running at right angles to the longitudinal axis, is displaceable from the intermediate position into a closing position, in which the closure side of the closure plate is pressed substantially perpendicularly against the valve seat and closes the opening in a substantially gas-tight manner, and back again; and
a valve body having a vacuum region, in which the opening, the valve seat and the closure plate are arranged, the at least one valve rod being guided movably along the longitudinal axis and the transverse axis through at least one gas-tight aperture in the valve body from the vacuum region into a drive region, which is arranged outside the vacuum region and in which the drive unit is arranged, wherein:
the at least one valve rod is rigidly connected to a sliding part of the drive unit, said sliding part being arranged in the drive region;
the sliding part, by means of a guide of the drive unit in the drive region:
   is guided non-pivotably, parallel to the longitudinal axis, between a first position, in which the closure plate is in the open position, and a second position in which the closure plate is in the intermediate position, and is slidable along the longitudinal axis, the guide blocking a further sliding of the sliding part in the longitudinal closing direction once the second position has been reached, and
   is guided non-pivotably, parallel to the transverse axis, between the second position and a third position, in which the closure plate is in the closing position and is slidable along the transverse axis,
the drive unit has a linear actuator with a displacement member linearly displaceable parallel to the longitudinal axis,
the displacement member is mechanically coupled to the sliding part via an inclined connection, in such a way that:
   the displacement member, when linearly displaced in the longitudinal closing direction, exerts a force, which is directed at an incline with respect to the longitudinal closing direction, onto the sliding part with force components in the longitudinal closing direction and in the transverse closing direction in order to displace the sliding part from the first position into the second position and from the second position into the third position, and,
   by means of the linear displacement of the displacement member in the longitudinal closing direction with the sliding part blocked in the longitudinal closing direction in the second position, the sliding part is slid in the transverse closing direction into the third position,
at least one support part protrudes rigidly from the sliding part in a direction against the longitudinal closing direction, a free end of the support part pointing in a direction against the longitudinal closing direction having a contact surface pointing in the transverse closing direction,
the sliding part is arranged between the closure plate and the contact surface, and
the contact surface, in the second position and the third position, is arranged opposite a support rigidly connected to the valve wall, in such a way that the free end of the support part is supported in the closing position on the support in the transverse closing direction.

14. The vacuum slide gate valve according to claim 13, wherein:
the at least one support part and the at least one valve rod are formed integrally and the at least one support part is formed by a portion of the at least one valve rod.

15. The vacuum slide gate valve according to claim 13, wherein:
the sliding part is arranged substantially centrally between the closure plate and the contact surface.

16. The vacuum slide gate valve according to claim 13, wherein the guide has a link guide.

17. The vacuum slide gate valve according to claim 16, wherein:
the link guide has:
   a guide part, which is connected by means of a pivot bearing to the sliding part pivotably about a geometric sliding part axis, which runs at right angles to the longitudinal axis and lies in a plane with respect to which the transverse axis forms a geometric normal,
   a first guide path, in which a first guide member of the guide part is guided, and
   a second guide path, in which a second guide member of the guide part is guided, and
   the guide members are offset with respect to one another in the longitudinal closing direction, and the guide paths running in such a way that the sliding part axis of the sliding part is guided from the first position into the second position parallel to the longitudinal axis and from the second position into the third position parallel to the transverse axis.

18. The vacuum slide gate valve according to claim 17, wherein:

the first guide path runs linearly parallel to the longitudinal axis, the second guide path is composed of a straight guide path portion and from a bent guide path portion, the straight guide path portion runs linearly parallel to the longitudinal axis with a linear extension, which corresponds to the linear extension of the first guide path, and the bent guide path portion extends substantially in or against the transverse closing direction.

19. The vacuum slide gate valve according to claim 18, wherein:

the bent guide path portion has the form of an arc segment of a geometric ellipse, of which a geometric first ellipse axis of the geometric ellipse lies on the first guide path, and of which a geometric second ellipse axis of the geometric ellipse lies on a geometric straight line parallel to the transverse axis and extending between the second position and the third position of the sliding part axis.

20. The vacuum slide gate valve according to claim 13, wherein:

the displacement member linearly displaceable parallel to the longitudinal axis has support rollers, which point opposite the transverse closing direction and which roll over a track connected to the valve body and extending parallel to the longitudinal axis, in order to support the displacement member on the valve body in the direction opposite the transverse closing direction.

* * * * *